United States Patent [19]
Sheldon et al.

[11] 3,989,340
[45] Nov. 2, 1976

[54] INSULATOR RAMP CLAMP FOR CONNECTORS

[75] Inventors: Luther M. Sheldon, Cranston; Robert E. Maloof, E. Greenwich, both of R.I.

[73] Assignee: General Electric Company, New York, N.Y.

[22] Filed: Apr. 29, 1975

[21] Appl. No.: 572,794

[52] U.S. Cl. .................. 339/103 C; 339/139 C; 339/209
[51] Int. Cl.² ................................ H01R 13/58
[58] Field of Search ........ 339/103 R, 103 B, 103 C, 339/105, 107, 139 C, 209

[56] References Cited
UNITED STATES PATENTS
1,181,451  5/1916  Hubbell...................... 339/103 R

*Primary Examiner*—Roy Lake
*Assistant Examiner*—DeWalden W. Jones
*Attorney, Agent, or Firm*—Paul E. Rochford; Walter C. Bernkopf

[57] ABSTRACT

An insulated clamp is provided for attachment to a cap or connector and for clamping a cable terminating in the cap or connector. The clamp includes an insulating lower cover for the cap or connector, a set of clamping cleats cooperating on ramps in the lower cover, and an insulating upper cover engaged with the lower cover by threads on confronting surfaces thereof. The lower cover has a generally tubular form and includes at its lower end an external hand gripping surface and internal means for attachment to and about the wire terminals of a cap or connector. The lower cover also has at its upper end a set of threads on an external surface and an internal set of ramps spaced radially around its inner periphery. The set of clamping cleats is mounted on a pliable band and the individual cleats have a double wedge form. The cleats are symetrically spaced around the band at stations matching the ramps of the lower cover. The upper cover has an external hand gripping surface and an internal threaded surface, the threads of which match the external threads of the lower cover. The upper cover also has an internal continuous ramp at its upper surface for cooperation with the upper wedges of the set of cleats. When the threads of the upper and lower covers are engaged and they are turned relative to one another, the cleats are forced inward by interaction of the ramps and double wedges to clamp a cable therebetween.

7 Claims, 11 Drawing Figures

INSULATOR RAMP CLAMP FOR CONNECTORS

RELATED APPLICATIONS

This application relates to applications Ser. No. 572,771 of Melvin Korman filed Apr. 29, 1975, and Ser. No. 462,027 of Melvin Korman and Luther M. Sheldon filed Apr. 18, 1974, and now U.S. Design Pat. No. D-238,176, issued Nov. 23, 1975, all of which are owned by the same assignee as this application.

BACKGROUND

The present invention relates to a cap and connector device and particularly to a cap and connector with an improved cable clamp. More specifically, it relates to an insulating clamp for a cable which clamp forms part of a cap or connector and permits the insulated clamping of a cable immediately adjacent the terminal end of the cable where it is connected to such a cap or connector.

It is well known that caps and connectors are employed to provide temporary connection between electric power supplies and apparatus which uses the electric power. The conductors of such cables are connected at at least one end to a cap or connector and specifically to electrical contacts provided in the caps and connectors. A patent, U.S. Pat. No. 3,461,417, issued to the same assignee as this application discloses such a cap and connector structure. U.S. Pat. No. 3,360,766 teaches an improved metal clamp. This patent teaches a cap and connector with a metal cable clamp such as has been used on wiring devices for many years. The present invention concerns such a cap and connector structure and particularly the clamp portion where the clamp is itself insulating and yet provides the strain relief function normally performed by metal clamps used in connection with such caps and connectors.

For some time, the use of caps and connectors has involved a grounding attachment for connection to such cable clamps and such a grounding feature is taught in the above referenced U.S. Pat. No. 3,461,417. However, there are some situations in which the presence of any metal on the external portion of the cap or connector particularly where a hand grip of the cap or connector might be obtained is deemed less desirable than a more insulating form of clamp.

Recently, there has been developed in the wiring device industry a number of such insulating cable clamps or strain relief clamps. Many of these are attached by the bringing together of two half portions, i.e. two halves of the insulated strain relief clamp members, and by the use of metal screws to attach these two halves together. One such insulating cord grip is taught in U.S. Pat. No. 3,779,593 and another in U.S. Pat. No. 3,437,980. Several others are also known. Generally, the cord clamps are intended for use in attaching cables of a relative wide range of wire sizes as the caps and connectors are used in conducting electric power of different amperages and voltages and phases. Where such a wide range of electric power types and levels are to be employed, the cables used in these applications vary not only as to size of the individual internal conductors, but vary also as to the number of conductors in the cable and the overall size of the cable including the outer jacket of the cable.

In addition, a number of patents concerned with cable clamping in connection with cable termination in caps and connectors have been disclosed in the patent art. Some patents which disclose such articles include U.S. Pat. Nos. 3,430,187; 3,865,461; 3,667,783; 3,624,591; 1,882,856; and 1,181,451; and British Pat. No. 165 issued 1899 and British Pat. Nos. 876,293 and 905,455; and also German Pat. No. 1,489,532.

One of the problems found with respect to the effectiveness of cable clamps for cable termination in caps and connectors is the limitation of sizes or the limitation of the range of diameters of the cables which are usable in connection with such clamps. Generally, it is found that the range of cable sizes is limited by the overall diameter of the clamp itself. Alternatively, it has been found necessary to use some form of adaptor in increasing the size range of clamps to make sure that cables of a wider range of sizes can be clamped. The need for use of such adaptors with prior art clamps relates to the range of cable diameters expected to be used in connection with clamps and with caps and connectors for which such clamps are used. One such cable clamp which employs adjustable adaptor is U.S. Pat. No. 3,624,591. Another form of cable clamp employing adaptors is the clamp of a cap and connector of Leviton manufacture. Where such adaptors are not employed, there is a tendency for some of such clamps to develop uneven perimeters as they are expanded to hold larger diameter cable so that it is not feasible to use two such clamps in conventional duplex receptacles where such caps are plugged into wall receptacles to obtain power to feed the cable attached to the wiring device.

A patent which discloses a cable clamp made of insulated material which has a narrow range of cable sizes which can be held by the clamp is the U.S. Pat. No. 3,667,783 of Sotolongo.

OBJECTS OF THE INVENTION

It is accordingly one object of the present invention to provide an insulating cable clamp which accepts and clamps cables of a wide range of sizes.

Another object is to provide a cable clamp which has essentially no exposed metal parts.

Another object is to provide a cable clamp for hand use which has no irregularities on its surface such as might injure the hand of a user.

Another object is to provide an insulated cable clamp which does not require metal tightening screws to close or open the clamp and which does not have screw ends protruding from the clamp portion of the device to make the gripping of the device uncomfortable and/or hazardous.

Another object is to provide a device which assembles and tightens very quickly about a cable to clamp it.

Another object is to provide a clamp structure which can be quickly disassembled and yet which holds the cable firmly during the normal use for the clamp.

Still another object is to provide a cable clamp having a smooth exterior and one which avoids getting caught or snagged on cables or equipment in use.

Another object is to provide a cable clamp having outer dimensions which permit mounting two such clamps in a single duplex wall outlet and which clamp nevertheless accepts and clamps cables of a wide range of diameters.

Other objects will be in part apparent and in part pointed out in the description which follows.

SUMMARY OF THE INVENTION

In one of its broader aspects, objects of the invention can be achieved by providing a cap and connector including an insulating contact housing and a cable clamp attachable to the housing. The cable clamp includes a lower cover clamp element which has an external gripping surface on a lower portion and an external thread on the upper external portion. Beneath the gripping portion is means for attachment of the contact housing of a cap or connector body internally of the lower cover. At the upper internal portion of the lower clamp cover are integral ramps and guides. To the ramps and guides of the lower cover are mounted a set of double wedges which wedges ride at their lower surfaces on the ramps intetral with the lower cover and which wedges are disposed about a flexible band. Above the double wedges is an upper cover element having an internally threaded surface and having a beveled upper surface to bear against the upper wedge of the double wedge elements of the cable clamp. The lower cover and upper cover are mechanically linked by the mating threads. The double wedges are compressed and forced inward by the turning of the upper cover relative to the lower cover to bring the two covers closer together. Each cover has a hand grip external surface.

In another of its aspects, objects of the invention are achieved by providing a first tubular clamp housing element and a second tubular clamp housing element. Each of these housings has external surfaces for hand gripping. The first housing has an external thread on an end portion of an external surface. The second clamp housing has internal means for attachment as a cover at least partially around a wire receiving insulating body, and also has internal ramp means for inducing radially inward movement of a wedge sliding on said ramp. The second clamp housing has a beveled internal surface for acting against the wedge to urge it inward along the ramps.

And the wedges of the clamp are mounted about a flexible band and are free to move in or out radially as the two clamp housing elements are moved together or apart in axial direction.

BRIEF DESCRIPTION OF THE FIGURES

The description of the invention which follows will be better understood by reference to the accompanying drawings in which.

DESCRIPTION OF A PREFERRED EMBODIMENT

Figure 2:
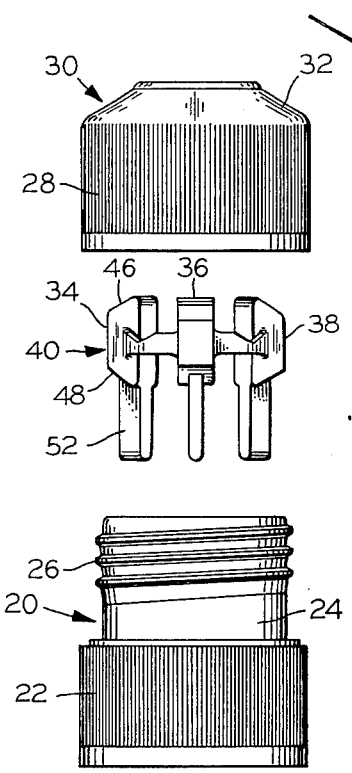
FIG. 2 is a view similar to that of FIG. 1, but with the connector in exploded form.

An insulating cable clamp is provided according to the present invention as part of a cap or connector article such as that taught in the U.S. Pat. No. 3,461,417 assigned to the same assignee as this application. The cap or connector has essentially two parts. The first part is the termination for the cable passing through the clamp and the second part is the clamp itself which is mounted and attached about the end of the cable to hold it in close relation to the cable termination portion of the cap or connector. The cable termination part of the article of this invention is not substantially different from that taught in the U.S. Pat. No. 3,461,417 and it consists generally of an insulating housing as illustrated in the bottom of FIG. 2 which housing is made up of two separable parts. The upper part 12 of the cable terminal 10 is a wire terminal housing and a lower part 14 is a housing for the blade contacts which are inserted into opening in the face of housing 14 when the connector is in use in receiving the matching blades of a plug. One wire terminal 16 which happens to be a grounding wire terminal is evident in the FIG. 2.

A set of assembly screws 18 are shown extended from the lower part of housing 14. These assembly screws extend up through screw holes in the outer walls of the housing 10 and are threaded into aligned screw holes on the inner wall of a lower housing 20 of the cable clamp of this invention. The assembly of the cable terminal 10 of the lower housing 20 of the clamp with the insertion of the screws gives the terminal housing and clamp housing the configuration shown in the bottom portion of FIG. 1.

The lower portion of cable clamp housing 20 has a generally tubular form and there are on the external surfaces of the tube a lower ribbed hand grip portion 22 and an upper tubular part 24 part of the surface of which is provided with threads 26.

An upper housing 30 of the cable clamp of this invention has a generally tubular form matching roughly in diameter the size of the tube of lower housing 20. The upper housing has an externally ribbed part 28 and also has a frustroconical upper end 32.

Figure 5:
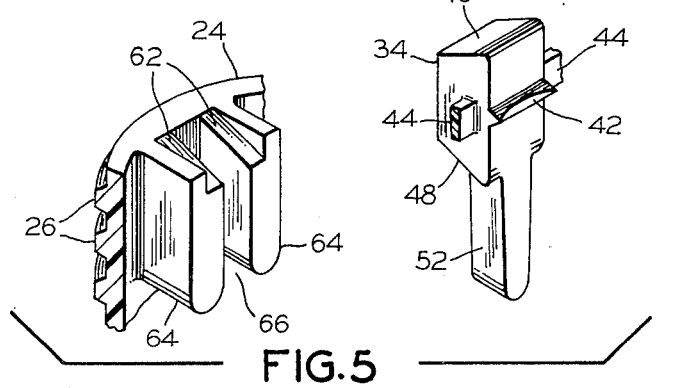
FIG. 5 is an exploded perspective view of a fragment of the housing of FIG. 3 illustrating the relationship between a ramp and double wedge.

Disposed between the lower housing 20 and upper housing 30 of the clamp is a set 40 of cleats for gripping a cable passing through the tubular clamp element. The individual cleats 34, 36, and 38 have a front surface which bears up against a cable and this front surface may be provided with a tooth 42 as best seen in FIG. 5. The individual cleats are joined by a band 44 of some flexible material as metal or plastic and are preferably formed integrally with the cleats themselves by a unitary molding of the cleats and band together. In addition to the forward gripping surface 42 each cleat is provided with a double wedge surface 46 and 48. Further, each cleat is provided with a depending guide 52.

Figure 3:
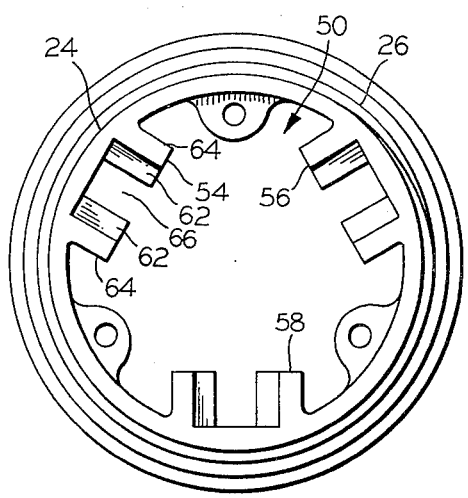
FIG. 3 is a top plan view of one housing part of the clamp illustrated in FIG. 2.

The function of these guides is described with reference to FIGS. 3 and 5. Specifically, the set of cleats 40 is positioned within the clamps 54, 56, and 58 within the interior 50 of the lower housing 20 of the clamp of this invention. Referring specifically to FIGS. 3 and 5 the ramp surface 62 of inwardly extending ribs 64 is formed integrally with the upper part of the lower housing 20. The lower wedge surface 48 rides in contact with the ramp surface 62 and the lower guide or boss 52 is positioned in the slot 66 between the two ribs 64. While the structurwe and relation of the parts is described above only with reference to ramp 54 and cleat 34, it will be understood that the other cleats 36 and 38 have essentially the same relationship with reference to the ramps 56 and 58 respectively.

Once the cleats have been located at their respective ramps, the upper housing 30 may be brought into place concentrically over the lower housing 20. It will be noted in FIG. 6 that the upper cover 30 has not only an external ribbed surface 28 and a frustroconical external surface 32, but it also has a beveled inner surface 68 and it is this surface which comes into contact with and bears against the upper wedge surface 46 of the cleats.

Figure 4:
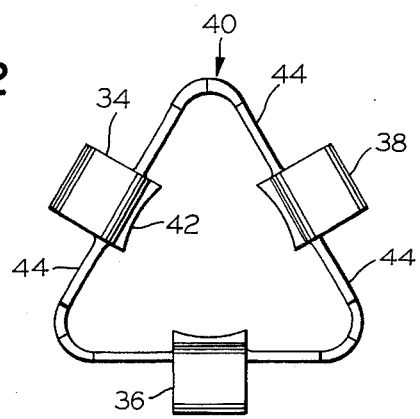
FIG. 4 is a top plan view of a set of cable gripping cleats set on a flexible band.
Figure 10:
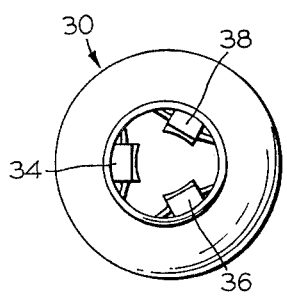
FIG. 10 is a top plan view similar to that of FIG. 9, but with the cleats more closely spaced as schematically illustrated in FIG. 8.
Figure 7:
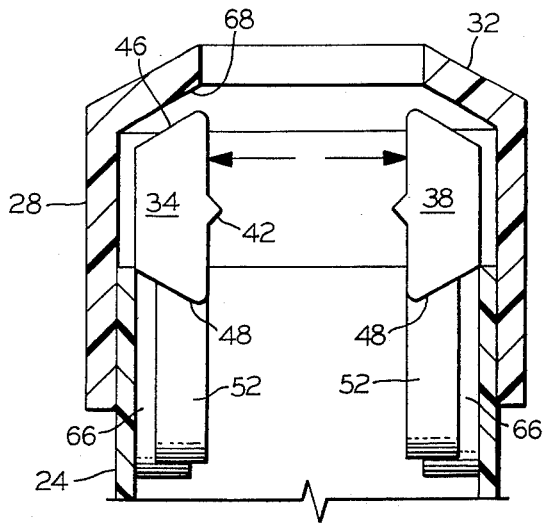
FIG. 7 is a vertical sectional schematic rendering illustrating the clamp housings in relation to clamp cleats.
Figure 8:
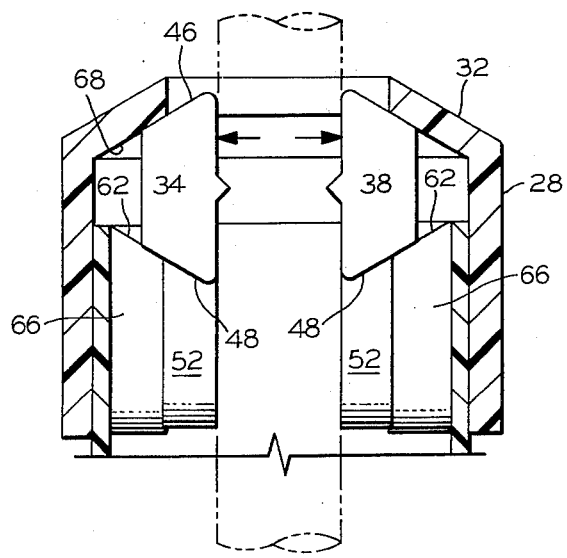
FIG. 8 is a schematic rendering similar to that of FIG. 7, but illustrating the cleats with closer spacing.

As the beveled surface 68 makes contact with the upper wedge surface 46 and as the lower wedge surface 48 makes contact with the ramp surface 62, the overall effect is that of wedging the cleat 34 radially inwardly toward the center or axis of the clamp. In FIGS. 7 and 8 this action is illustrated. In these figures the cleats and ramps are positioned and shown illustratively as being two cleats on opposite sides of the clamp as opposed to the three cleats illustrated in FIGS. 2, 3, and 4. It is of course possible to use only two cleats or three or more cleats where the spacing of the cleats is such that an effective even distribution of pressure is generated on the cleats to urge them generally toward the axis of the clamp device. In the illustration of FIGS. 7 and 8, the upper housing 30 is shown disposed above and out of contact with the cleats 34 and 38. Particularly cleat 34 is shown in relation to the ramp and embeveled surfaces described above. As the upper housing 30 is turned relative to the lower housing the threads on the external surface of the upper part 24 of lower housing 20 and the threads on the inner surface of the upper housing 30 mesh and cause the upper housing 30 to move axially down toward and over the upper part 24 of the lower housing 20. As this axial motion occurs the beveled surface 68 is brought to bear against the upper wedge surface 46 and causes the cleat 34 to be wedged out from the wall position in which it is shown in FIG. 7 toward the center and in particular to a position as illustrated in FIG. 8. Similarly, the wedge 38 is simultaneously wedged out from its position as illustrated in FIG. 7 toward thd more central position illustrated in FIG. 8. The guides 52 acting within the slots 66 aid in preventing twisting or turning of the cleats relative to the axis of the clamp and keep the double wedged surfaces of the cleats aligned with the beveled and ramped surface of the parts of the clamp bearing thereagainst. The net result is that the cleats are forced in towards the axis of the clamp and are forced to bear against and to grip a cable extending through the center of the clamp mechanism.

Figure 6:
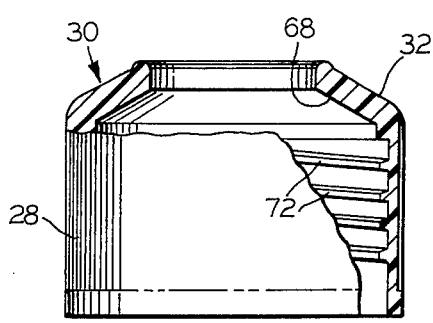
FIG. 6 is an elevational view in part in section of an upper housing part of a cable clamp as provided pursuant to this invention.
Figure 11:
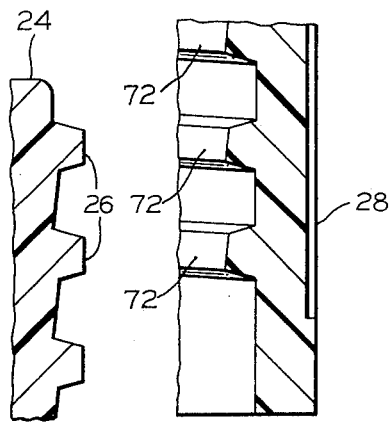
FIG. 11 is a detailed vertical section of a set of threads useful in axial movement of the upper housing of the clamp relative to the lower housing.

The schematic illustrations of FIGS. 7 and 8 do not show the threads on the external surface of the housing 20 or on the internal surface of the housing 30, but the threads are omitted only to make the illustration clearer. The internal threads 72 on the internal wall of upper housing 30 are illustrated in FIGS. 6 and 11 and in FIG. 11 a particular form of threads which may be the locking form of threads also known as Dardalet type of threads is shown.

Figure 1:
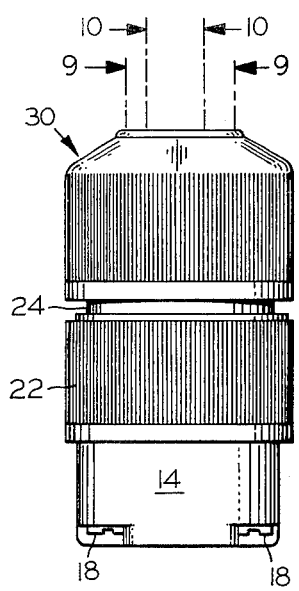
FIG. 1 is an elevational view of a connector with a cable clamp as provided pursuant to this invention.
Figure 9:
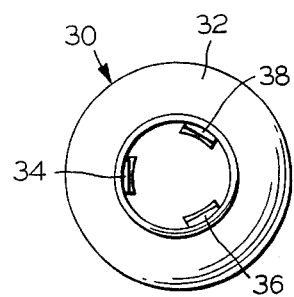
FIG. 9 is a top plan view of a connector as illustrated in FIG. 1, but with the cleats spread as schematically illustrated in FIG. 7.

The net effect of the turning of the upper housing 30 of the clamp relative to the lower housing is illustrated in FIG. 9 again for the purpose of additional clarity of illustration. In this figure it will be seen that the top plan view of the clamp shows the upper beveled surface 32 and shows a wide spacing of the cleats 34, 36, and 38 and in particular shows these cleats to be separated by a distance which is represented in FIG. 1 by the dotted lines 9—9. In other words, the diameter of a cable which would fit within the clamp is illustrated by the dotted lines 9—9 of FIG. 1. After the upper cover 30 has been turned relative to the lower housing and the cleats 34, 36, and 38 have been wedged toward the axis of the clamp the cable which could be gripped by the cleats would be roughly represented by the dotted lines 10—10 of FIG. 1. Accordingly, one of the features of the present invention is that a very wide range of cables can be gripped within the cable clamp of this invention and the adjustment of the clamp from the wider to the narrower diameter can be accomplished simply by the turning of the upper housing of the clamp relative to the lower housing. In fact, it has been found that a range of wires varying from about seven-eighths of an inch in diameter down to one quarter of an inch in diameter can be gripped by a clamp employing the mechanism of this invention and this three-to-one range in cable clamping capability is only illustrative of the cable clamping ability which can be achieved using the mechanism as described and claimed herein.

We claim:
1. A cable clamp comprising
   a first and a second tubular housing,
   said housings being axially aligned and having external hand grip surfaces to permit opposite rotation thereof,
   said housings having a set of cooperating threads to induce axial movement responsive to opposite rotation thereof,
   and said housings being adapted to having a cable pass therethrough,
   a set of double wedge cable grip cleats positioned within said housings,
   ramp means supported on the interior of said first and of said second housing,
   said ramp means bearing against and being meshed with said set of double wedge cleats,
   an axial movement of said tubular housings inducing radial inward movement of said double wedge cleats,
   and said cleats cooperating on inward movement thereof to grip a cable passing therethrough.
2. The clamp of claim 1
   wherein the axially outward movement of the tubular housings results in a radially outward movement of the double wedge cleats.
3. The clamp of claim 1
   wherein the double wedge cleats are mounted to a resilient band.
4. The clamp of claim 3
   wherein the double wedge cleats are formed integrally with a resilient band.
5. The clamp of claim 1
   wherein the double wedge cable grip cleats are three in number and the three cleats are set equidistantly around the tube interior.
6. The clamp of claim 1 wherein the first tubular housing has internal means for securing a separable cable termination at least partially therein.

7. The clamp of claim 1 wherein the first tubular housing has internal means for securing a separable cable termination proximate one end and has external threads proximate the opposite end.

* * * * *